US005657783A

United States Patent [19]

Sisko et al.

[11] Patent Number: 5,657,783

[45] Date of Patent: Aug. 19, 1997

[54] FOREARM RESTS COMBINED WITH AN INVALID WALKER

[76] Inventors: Mike R. Sisko, 408 Buttonwood St.; Henry J. Krouse, 1046 Third St., both of No. Catasaqua, Pa. 18032

[21] Appl. No.: 541,712

[22] Filed: Oct. 10, 1995

[51] Int. Cl.$^{6}$ .............................. A61H 3/00; F16M 13/08

[52] U.S. Cl. .............................. 135/67; 135/66; 135/71; 135/72; 135/73; 135/76

[58] Field of Search .............................. 135/67, 66, 65, 135/71, 72, 76, 73

[56] References Cited

U.S. PATENT DOCUMENTS

| | | | |
|---|---|---|---|
| D. 181,957 | 1/1958 | Callahan . | |
| 2,708,473 | 5/1955 | Gable et al. | 135/67 |
| 2,817,387 | 12/1957 | Blake | 135/67 |
| 4,094,331 | 6/1978 | Rozsa | 135/67 |
| 4,135,535 | 1/1979 | Thomas | 135/67 |
| 4,196,742 | 4/1980 | Owen, Jr. . | |
| 4,314,576 | 2/1982 | McGee | 135/67 |
| 4,411,283 | 10/1983 | Lucarelli | 135/67 |
| 4,993,446 | 2/1991 | Yarbrough . | |
| 5,224,717 | 7/1993 | Lowen | 135/73 X |
| 5,305,773 | 4/1994 | Browning | 135/67 |
| 5,347,666 | 9/1994 | Kippes | 135/67 X |

*Primary Examiner*—Wynn E. Wood
*Attorney, Agent, or Firm*—Jonathan A. Bay

[57] ABSTRACT

Forearm rests are combined with a conventional invalid walker. The forearm rests are located generally spaced above the normal hand-grips. The forearm rests are advantageous for providing inward lateral support to the user's outwardly flexed forearms while the user is grasping the hand-grips and while the user is one of (i) maneuvering the walker and (ii) partly supporting and stabilizing him or herself while standing and walking. The forearm rests provide better stability and support for a user who has diminished arm strength and/or diminished motor control over his or her arm muscles. The forearm-rests can be formed in an accessory apparatus that allows attachment to a conventional walker (without forearm rests) in order to enhance the walker and give it the desirable forearm rests.

15 Claims, 4 Drawing Sheets

FOREARM RESTS COMBINED WITH AN INVALID WALKER

BACKGROUND OF THE INVENTION

1. Field of the Invention

The invention relates to the art of invalid walkers, and in particular concerns forearm rests combined with most any type of conventional invalid walker. The forearm rests are located spaced above the normal hand grips of the walker, and are arranged to provide inward-lateral support to a user's outwardly flexed forearms as the user is supporting and/or steadying him or herself while in a standing position, which includes while walking.

2. Prior Art

Invalid walkers are apparatus that are well known in the art for helping invalid users to stand and/or walk relatively freely across level ground or up and down stairs and the like. A representative invalid walker for crossing level ground is shown by U.S. Pat. No. 4,135,535—Thomas. An invalid walker which can be selectively altered dually for (i) crossing level ground or (ii) negotiating stairs, is shown by U.S. Pat. No. 4,094,331—Rozsa.

Conventional walkers need to be inherently strong as well as stable because an invalid user must rely upon the walker as his or her sole source of support. They are preferably also light in weight and relatively inexpensive. They are popularly made out of aluminum tubing frames.

Conventional invalid walkers, like the Thomas and Rozsa walkers, have normal hand grips located about the top of the aluminum-tube frame. The normal hand grips give the user something to grasp and steady him or herself in the standing position. Both the Thomas and Rozsa walkers also feature a lower set of hand grips, below the normal and upper set of hand-grips. In the Thomas walker, the lower set of hand grips give the user something to grab when assuming the standing position from the sitting position. In the Rozsa walker, the lower set of hand grips are located where the user can hold them when climbing steps. When climbing steps, the Rozsa walker would be placed on stair steps both in front and above the step that the user is standing on. Thus the normal set of upper hand grips would be too uncomfortably high, or simply not practically usable, for the user to support and steady him or herself. However, the user would revert to grasping the normal, upper set of hand grips when crossing level ground.

With both Thomas and Rozsa, these walkers are conventional as far as giving the user, during normal modes of use (as crossing level ground), only the normal set of hand-grips to gain support from, and steady him or herself. Yet, other walkers have been configured to give the user additional assistance, such as support under the armpits by extensions that appear like the upper ends of crutches. For example, see U.S. Pat. No. Des. 181,957—Callahan; and, U.S. Pat. No. 4,993,446—Yarbrough.

These last two walkers, the walkers of Callahan and Yarbrough, have exchanged lightness of weight and the relatively compact size of a conventional walker, for inherently taller and heavier, more massive structures. In respect of being tall, the Callahan and Yarbrough walkers have upper extensions that reach up under the arm pits of a standing user, whereas the Thomas or Rozsa walkers are no higher than waist high.

It is generally true that a taller structure is more easily tipped or teetered over relative to a shorter structure, unless the taller structure is given a comparatively wide base. But in order to do that, the Callahan or Yarbrough walker must be modified until the leg posts flare out like outriggers.

The Callahan and Yarbrough walkers are also relatively more massive and heavier than conventional walkers. Presumably they are more expensive than conventional walkers too. These characteristics detract from their utility as compared to conventional walkers. Conventional walkers are easily portable. Conventional walkers typically collapse for storage or transport, such as to fit in a trunk or back seat of a car. Conventional walkers are also easily handled and lifted by the invalid users, or at least slid. Conventional walkers are presumably more easily maneuvered than a walker reaching up under the arm pits, because conventional walker is simply "steered" more as less as a wheelbarrow.

However, the Callahan and Yarbrough walkers do address shortcomings that conventional walkers do not. And those are, that conventional walkers require the invalid user to have relatively great arm strength and relatively steady motor control of his or her arm muscles. Instead, the reverse is more likely. Any user who has such weak legs or unsteady motor control over his or her leg muscles as to need a walker, is just as likely to suffer from diminished arm strength and diminished motor control over his or her arm muscles.

It would be a desirable improvement in walkers, if a conventional walker could be modified to give the user better support so that the user gets by safely with diminished arm strength and motor control over his or her arm muscles. Additionally, it would be a desirable improvement in walkers if this modification or enhancement could be achieved while insignificantly adding any more size and/or weight to the walker, or detracting from its general utility or popularity. What is needed is an improved invalid walker apparatus or enhancement thereto, which overcomes the shortcomings of the prior art.

SUMMARY OF THE INVENTION

It is an object of the invention to modify a conventional walker with forearm rests at locations above the normal hand-grips, to give an invalid user who suffers from diminished arm strength and/or motor control over his or her muscles, better and more steady support in the standing position, including while walking.

It is another object of the invention to accomplish the above modification via a device that is attachable to much of the existing designs of conventional walkers, as an after-market accessory or enhancement to such conventional walkers.

It is an additional object of the invention to provide such an accessory in a relatively lightweight and inexpensive form without detracting from the strength, utility, or portability of the combination of the accessory and conventional walker.

These and other aspects and objects are provided according to the invention in an improved invalid walker. The improved invalid walker is conventional as far as having front and rear feet interconnected by frame members in a fixed and spaced relationship. There are also left and right hand-grips, as normally found on a conventional walker, that give a user means both for (i) maneuvering the walker as well as (ii) for partly supporting and stabilizing him or herself while standing and walking.

An inventive aspect of this invalid walker concerns a pair of spaced side members that form left and right abutment surfaces for the user to flex his or her left and right forearms against. These abutment surfaces define the forearm rests. And these forearm rests are positioned and arranged relative to the normal hand-grips on the walker, to provide inward lateral support to the user's outwardly flexed forearms. Inward lateral support is advantageous at times when the user is grasping the hand-grips and while the user is one of (i) maneuvering the walker and/or (ii) partly supporting and stabilizing him or herself while standing and walking.

It is optional to form the forearm rests with indentations in which the user can wedge his or her forearms into. These indentations promote retaining the user's flexed forearms in a given orientation. They also reduce the amount of strength the user needs to lock or maintain his or her arms in a given state of bent flexion. Preferably the forearm rests might also carry resilient padding, both for cushioning purposes as well as for increasing frictional engagement with the user's forearms when flexed thereagainst. Increased frictional engagement is good for keeping the user's forearms from slipping.

It is also optional that the foregoing improvements for an invalid walker are achieved by virtue of an after-market accessory or enhancement to an existing walker.

This after-market accessory, or forearm-rest accessory, includes appropriately sized and located brackets for attaching the forearm-rest accessory to the walker. The accessory might come in a version in which it is a single rigid piece. The brackets can be configured to either allow the forearm-rest accessory to be bolted to the walker. Or else, the brackets might be formed to allow riveting, clamping or welding. The brackets can even be formed to allow releasable attachment via a quick-connector type of snap-on action.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
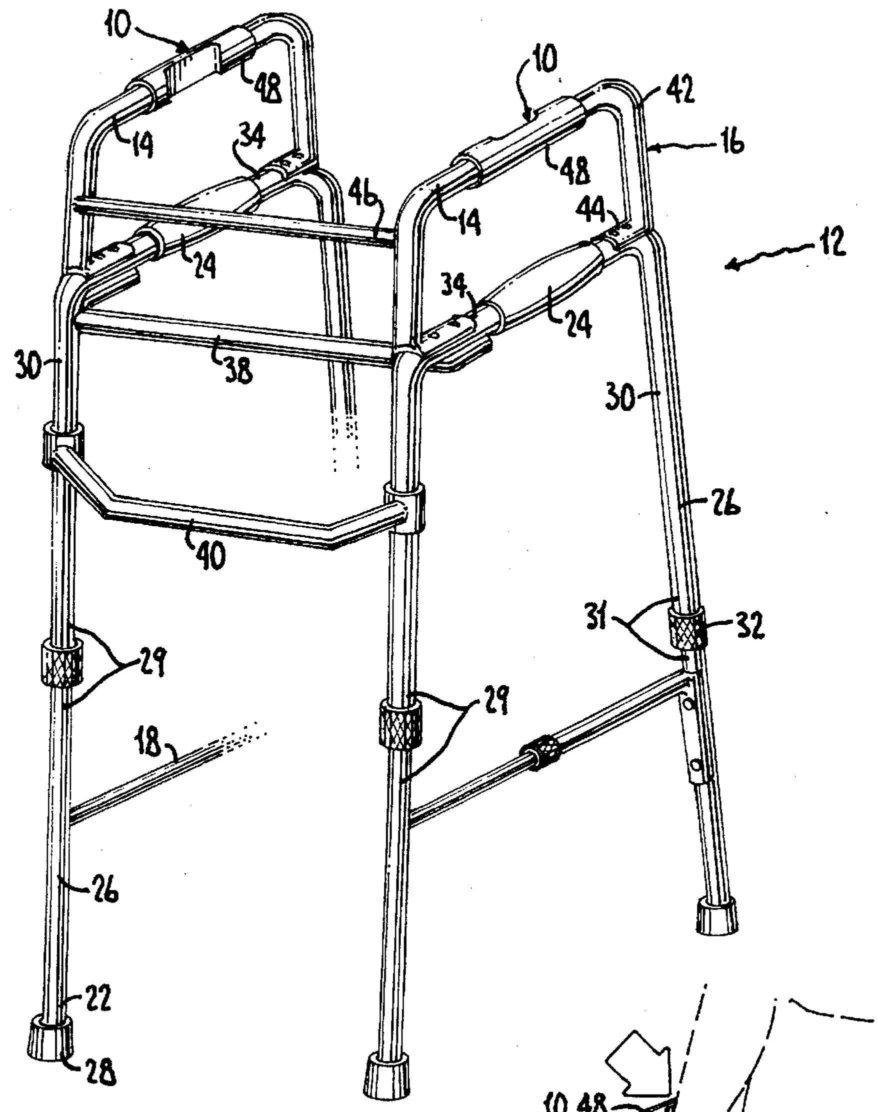
FIG. 1 is a perspective view of forearm rests combined with an invalid walker according to the invention, with portions of the walker broken away.

FIG. 1 shows forearm rests 10 combined with an invalid walker 12 in accordance with the invention, wherein the forearm rests 10 are defined portions on left and right elongated rails 14 of a unitary assembly 16 which is attachable to a conventional walker (as is shown) as an after-market accessory for the walker 12.

The walker 12 comprises an aluminum-tube frame 18, and especially includes a pair of front and rear feet 22, and left and right hand-grips 24. Each foot 22 is defined by the lower, extreme end of a leg post 26, and each lower extreme end being is inserted in a footpad 28 for wear-protection. These leg posts 26 extend up and are telescoped into inverted-U shaped side members 30. These U-shaped side members 30 carry an arrangement of locking collars 32 at their opposite ends to provide vertical adjustability with the leg posts 26. Also, these U-shaped side members 30 have inverted arms which, together with the telescoped leg posts 26, define a set of forward leg arrangements 29 for the frame 18, as well as a complementary set rearward leg arrangements 31.

The U-shaped side members 30 include horizontally extending (as viewed in FIG. 1) cross bars 34, and the hand-grips 24 are defined by sleeves that are positioned midway on these cross bars 34. These sleeves 24 are either given a hand-grip contour or are resilient to provide the user with a comfortable, graspable element to better use and/or maneuver the walker, as is well known in the art. The aluminum-tube frame 18 includes struts and braces and the like, as the upper and lower front pieces 38 and 40 shown in FIG. 1, to give the walker 12 the desired configuration and rigidity.

The walker 12 depicted in the drawings is given as a non-limiting example of a conventional walker. Other arrangements of conventional walkers are known, and accordingly, the depiction and description here of this walker 12 is merely done so for convenience and does not limit the invention.

The forearm-rest accessory 12 comprises left and right, inverted-U shaped tubes 42, as aluminum tubing or the like. The opposite ends 44 of each tube are bent inward and formed as brackets. More particularly, these bracket ends 44 are formed with semi-circular cross-sections for placement in close fitting contact on spaced portions of the cross bars 34 of the walker that carry the hand-grip sleeves 24. The left and right tubes 42 are stabilized in a given spaced relationship by a from strut 46 welded at its opposite ends to the tubes 42. The forearm-rest accessory 16 is attached securely to the walker 12 by bolts or like fasteners, although other appropriate fastening means are properly suitable for the purpose, such as for example rivets, tube clamps, welds and so on.

Figure 2:
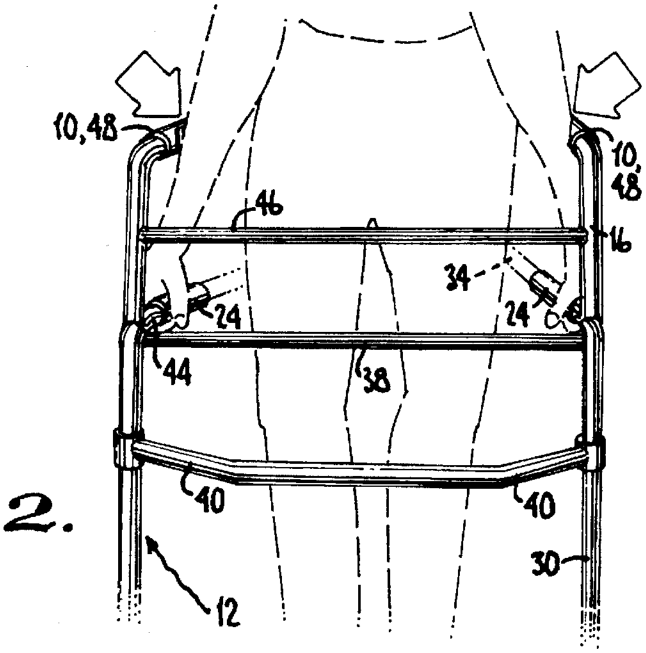
FIG. 2 is a front perspective view thereof, with a user shown in broken lines to show the relative arrangement between the forearm rests and the normal hand-grips.

The left and right tubes 42 include the elongated rails 14 (mentioned above) that carry elastomer sleeves 48. The elastomer sleeves 48 are formed with indentations which, as shown by FIG. 2, allow a user to flex his or her forearms therein. When this occurs, the indentations assist retaining the user's forearms in a given orientation, as shown.

In FIG. 2, the user is depicted grasping the hand-grips 24 of the walker 12 as he or she ordinarily would do, to either (i) maneuver the walker 12 or (ii) partly support or stabilize him or herself while standing or walking with the walker 12. FIG. 2 also shows the advantages given by the forearm rests 10. The user has his or her forearms flexed outwardly as far as possible until stopped by the forearm rests 10. The indentations act to prevent axial sliding (i.e., in the front to back direction in FIG. 2) of the user's forearms relative the axes of the elongated rails 14.

When the user deploys the forearm rests 10 to assist him or her in standing or walking more stably than is possible without the forearm rests, then the forearm rests 10 function in the following way. The forearm rests 10 relieve the user of having to lock his or her elbows in a straight, or slightly bent, arm alignment. Put differently, the forearm rests 10 permit the user to relax more and get by with much less arm strength in terms of locking the elbows. Additionally, it is expected that the typical user of the walker 12 could suffer from the kinds of diminished muscle/motor control that appear as some form of trembling or jerky shaking. In accordance with the invention, the forearm rests 10 and hand-grips 24, in combination, give the user as many as four points of contact with the walker 12 while the user is standing or walking. Thus the user enjoys more stable standing and walking because of the four, rather than two, points of contact.

If the user is in the act of maneuvering the walker 12 from one position on the ground to a new position, the forearm rests 10 provide the following advantages, in accordance with the following actions of the user. Preliminarily, to maneuver the walker 12, the user will either lift it off the ground, or at least tip it so that one or another of the pairs of feet 22 leave the ground. The user then will either place the walker 12 down into the new position, or else slide it there. It is in the act of tipping the walker 12—whether lifted completely off the ground or not—that the forearm rests 10 provide an advantage. The walker 12 can be tipped merely by the user flexing his or her elbows. Without the forearm rests 10, the user must do all the work of tipping the walker 12 with his or her wrists. Thus, in the act of maneuvering the walker 12, the forearm rests 10 permit the user to get by with much less wrist strength, and instead get by with flexure from the typically stronger upper arm muscles, as the biceps.

FIGS. 3–6 show further embodiments of the forearm-rest accessory. The FIG. 3 forearm-rest accessory 50 is formed from a single piece of aluminum tubing. If viewed in plan view, the forearm-rest accessory 50 overall generally defines a U-shape. The opposite ends of the tube are formed as brackets 44 for attaching to the walker 12 (not shown) on the rear portions of the cross bars 34 of the walker that carry the hand-grip sleeves 24 (compare FIG. 1). This single tube has a middle or medial segment 52 that is formed comparably with a semi-cylindrical section as the end segments 44, and for the same purpose. Namely, this medial segment 52 is formed to function as a third bracket for the forearm-rest accessory 52, to be attached to the walker 12 on the upper front piece 38 (not shown, but compare FIG. 1). This medial bracket 52 is located at the base of squared-V shape. Persons having ordinary skill in the art could appropriately vary the dimensions and arrangement of this square-V shape so that the medial bracket 52 would mate the upper front piece 38, or the next most appropriate frame member, of most given walkers.

The elongated rails 14 of the forearm-rest accessory 50 are covered in sleeves of resilient material 54. The resilient material 54 provides cushioning to the user's forearms as well as increases frictional engagement between the user's flexed forearms and the elongated rails 14. Increased frictional engagement reduces the likelihood that the user's forearms will slide axially along the axes of the elongated rails 14 at times when the user wouldn't want that.

Figure 3:
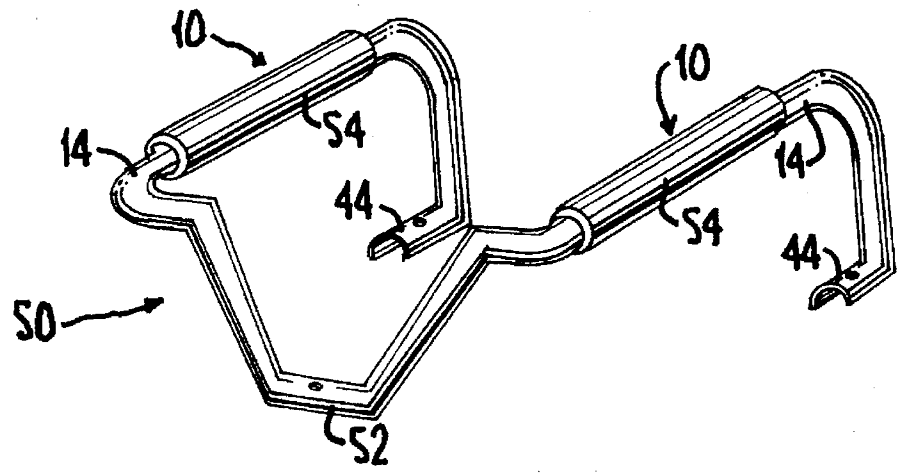
FIG. 3 is a perspective view of an alternate embodiment of the forearm rests, as detached from the walker (not shown)
Figure 4:
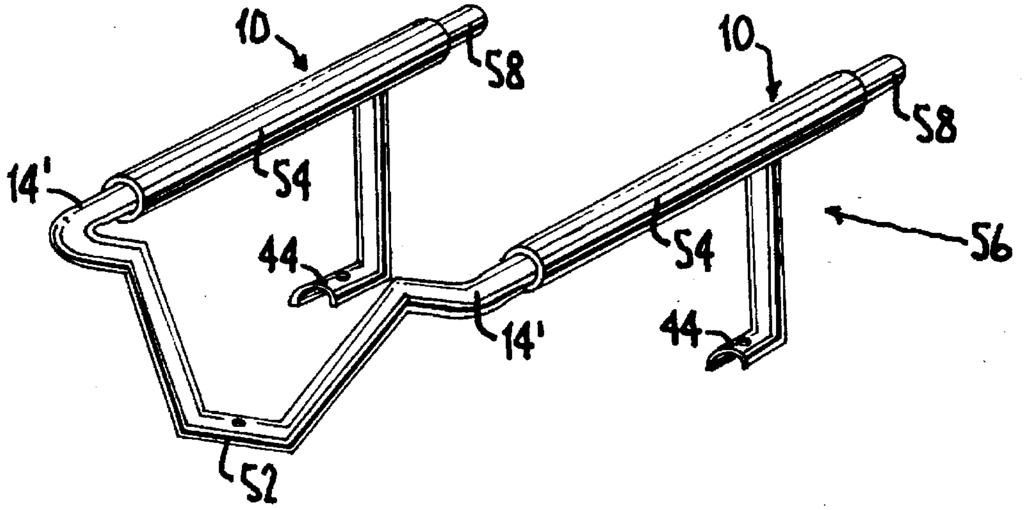
FIG. 4 is a perspective view of another embodiment of the forearm-rests.

FIG. 4 shows a forearm-rest accessory 56 that is an embellishment of the FIG. 3 version. The left and right elongated rails 14' are formed with rearward extensions 58. The rearward extensions 58 increase the active length of the elongated rails 14' that are usable as forearm rests 10. The rearward extensions 58 are most advantageous when the user would have the walker positioned relatively far out in front of him or herself. In that situation, the user's arms would presumably be extended far forward, and would define a relatively sharp angle relative to elongated rafts 14' (if viewed in side elevation, but not shown). Given that alignment between the user's arms and the elongated rails 14', the user's arms would align on the elongated rails 14 at some point in the rear extensions 58, rather than on some relatively more forward point.

To rephrase the foregoing in different terminology with a comparable meaning, these rearward extensions 58 define abutment surface portions that extend sufficiently rearward relative to the rearward leg arrangements 31 (not shown in FIG. 4, but see FIG. 1), such that a user standing behind and walking into that much of the frame 18 which substantially comprises the forward and rearward leg arrangements 29 and 31 (i.e., the leg posts 26 and inverted-U shaped side members 30), would still gets meaningful forearm support from the abutment surface portions of the rearward extensions 58, even along relatively rearward portions thereof.

Figure 5:
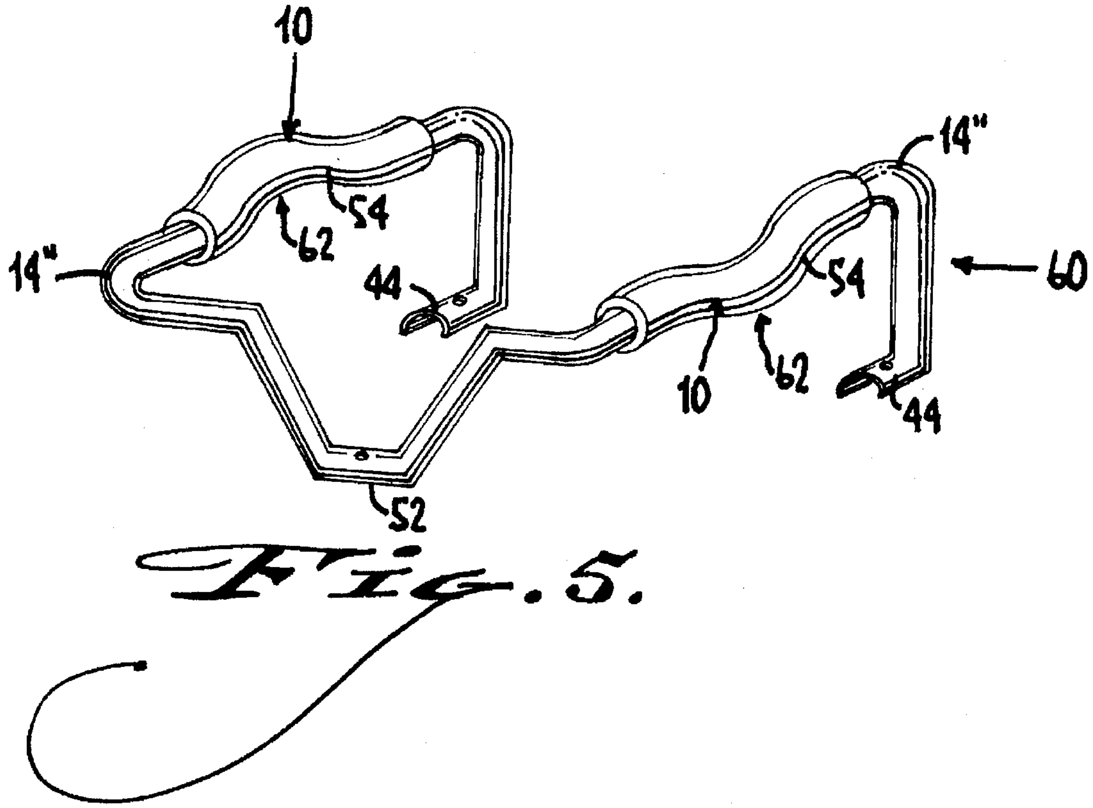
FIG. 5 is a perspective view of an additional embodiment of the forearm rests.

FIG. 5 shows another version of a forearm-rest accessory 60 that is a further embellishment on the FIG. 3 version. The elongated rails 14" are formed with outwardly curved segments 62. These curved segments 62 are covered in resilient sleeves 54 and are useful to promote retention of the user's forearms in a preferred chosen orientation relative the hand-grips 24 of the walker (this orientation not shown in FIG. 5, but compare FIG. 2).

Figure 6:
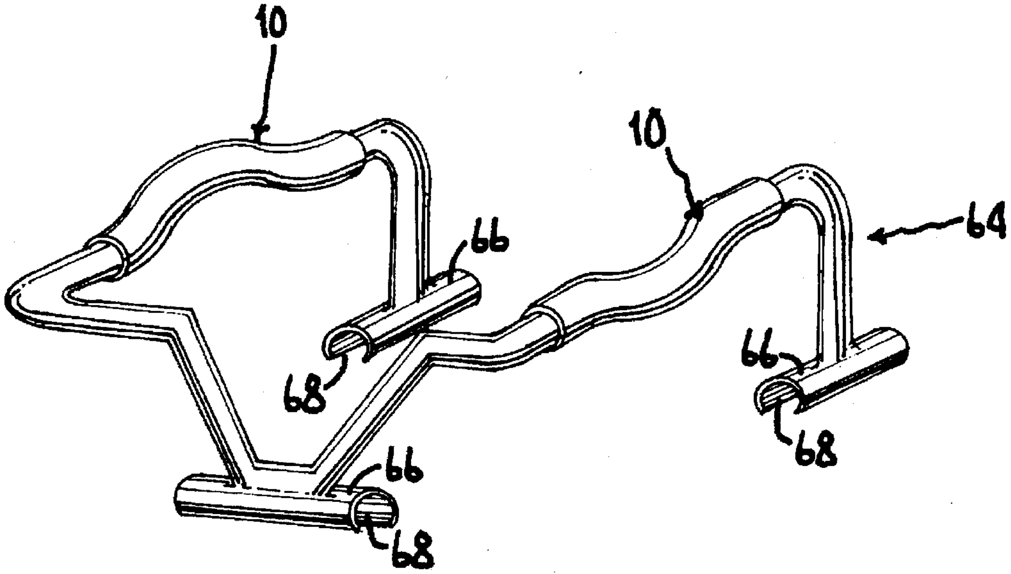
FIG. 6 is a perspective view of still another embodiment of the forearm rests; and, FIG. 7 is a perspective view comparable to FIG. 1, except that the FIG. 4 embodiment of the forearm rests is combined with the invalid walker.
Figure 7:
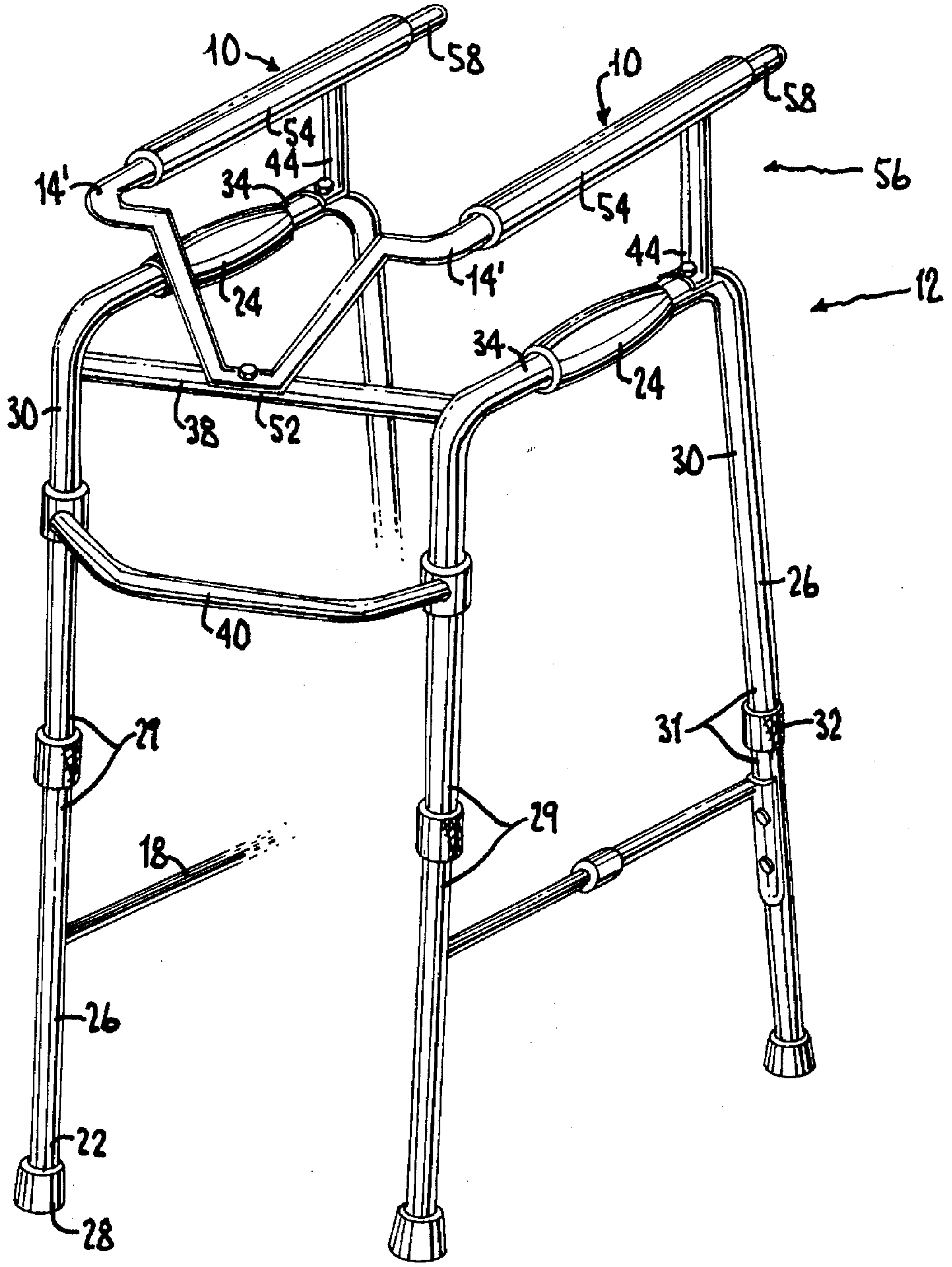

FIG. 6 shows a variation of the bracket portions 66 for the FIG. 6 forearm-rest accessory 64, as shown particularly as a change from the FIG. 5 version. However, this variation in the bracket portions 66 is not limited to changing the FIG. 5 version alone, as it could be incorporated by any of the previous versions of the forearm-rest accessory. In FIG. 6, the bracket portions 66 are formed as sleeves that include axially extending slits 68 therein. This configuration of the bracket portions 66 permits quick connection and disconnection of the forearm-rest accessory 64 to and from the walker 12, via a snap-on action or the like (not illustrated).

FIG. 6 shows the walker 12 of FIG. 6 combined with the forearm rest accessory 56 of FIG. 4 to provide forearm rests 10 in accordance with the invention. In FIG. 6, the walker frame 18 includes the inverted-U shaped tubes 30 that form the forward and rearward leg arrangements 29 and 32, and which terminate in feet 22 covered by pads 28. The left and right hand grips 24 are situated on the cross bars 34 of tubes 30, and tubes 30 are spaced by front pieces 38 and 40. The length of the leg arrangements 29 and 31 is adjustable via telescoped tubes and a locking collar 32. The forearm-rest accessory 56 is attached via bracket portions 44 and 52 to the walker frame 18, on cross bars 34 and upper front piece 38 respectively. As previously stated, an inventive aspect of the forearm-rest accessory 56 relates to the left and right elongated rails 14' being formed with rearward extensions 58. The rearward extensions 58 increase the active length of the elongated rails 14' that are usable as forearm rests 10.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An invalid walker comprising:

a pair of front and rear feet and a system of frame members for connecting the front and rear feet together in a fixed and spaced relationship;

said system of frame members further comprising respective sets of forward and rearward leg arrangements that terminate in the front and rear feet, respectively;

the system of frame members including a spaced pair of members that are arranged to form left and right hand-grips and are disposed in a given elevation relative to the feet in order to give a user hand-grips at a conventional elevation both for maneuvering the walker as well as for partly supporting and stabilizing him or herself while standing and walking;

the system of frame members further including another spaced pair of members that define left and right abutment surfaces for the user to flex his or her left and right forearms thereagainst, the abutment surfaces being positioned and arranged relative the hand-grips to provide inward lateral support to the user's outwardly flexed forearms while the user is grasping the hand-grips and as the user is one of (i) maneuvering the walker and (ii) partly supporting and stabilizing him or herself while standing and walking:

wherein the members that define the abutment surfaces are further arranged to extend sufficiently rearwardly of the rearward leg arrangements such that a user standing behind and walking toward the rearward leg arrangements still gets meaningful forearm support from the abutment surfaces, even along relatively rearward portions thereof.

2. The invalid walker of claim 1, wherein said other pair of spaced members, which define the abutment surfaces, are formed with indentations for retaining the user's flexed forearms in a given orientation relative the hand-grips.

3. The invalid walker of claim 1, wherein said other pair of spaced members, which define the abutment surfaces, carry resilient padding which provide cushioning as well as frictional gripping to the user's forearms when flexed thereagainst.

4. The invalid walker of claim 1, wherein said other pair of spaced members, which define the abutment surfaces, carry sleeves which are formed with indentations for retaining the user's flexed forearms in a given orientation relative the hand-grips.

5. The invalid walker of claim 1, wherein the system of frame members comprises a plurality of elongated tubes.

6. The invalid walker of claim 1, wherein each foot comprises the lower extremity of a tubular member inserted in a foot pad for wear-protection.

7. An accessory for an invalid walker of the type that has a pair of front and rear feet and a system of frame members for connecting the front and rear feet together in a fixed and spaced relationship, which system of frame members includes a spaced pair of members that are arranged to form left and right hand-grips and are disposed in a given elevation relative to the feet in order to give a user hand-grips at a conventional elevation both for maneuvering the walker as well as for partly supporting and stabilizing him or herself while standing and walking, the system of frame members further including other members that are partly configured to accept the fixing thereto of bracket-like hardware; said accessory comprising:

left and right side portions;

bracket portions, each which is shaped and arranged for fixing securely to such a member of the walker that is partly configured to accept the fixing thereto of bracket-like hardware; and, a system of brace portions that extends among and interconnects the bracket portions in a rigid relationship with left and right side portions;

wherein the left and right side portions are formed to define left and right abutment surfaces for the user to flex his or her left and right forearms thereagainst; and, wherein the accessory is configured so that attachment of the accessory to the walker via the bracket portions places the abutment surfaces in such a position and arrangement relative the hand-grips as to provide inward lateral support to the user's outwardly flexed forearms while the user is grasping the hand-grips and as the user is one of (i) maneuvering the walker and (ii) partly supporting and stabilizing him or herself while standing and walking.

8. The accessory of claim 7, wherein said accessory is formed as a rigid, unitary assembly, partly for the convenience of releasable attachment to and detachment from the walker.

9. The accessory of claim 7, wherein said accessory is formed from a single piece of an aluminum tube formed generally in a U-shape when viewed in plan.

10. The accessory of claim 9, wherein the left and right side portions, the bracket portions and the system of brace portions are just different segments of the single piece of aluminum tube.

11. The accessory of claim 7, wherein the bracket portions comprise semicircular segments for fixing to a given walker that has such other members that are partly configured in a complementary configuration, so that the accessory can be releasably attached to the given walker via fasteners between the bracket portions and the given walker.

12. The accessory of claim 7, wherein the bracket portions comprise slit, resilient sleeves for fixing to a given walker that has such other members that are partly configured in a complementary configuration, so that the accessory can be releasably attached to the given walker via a quick-connector type of snap-on action.

13. The accessory of claim 7, wherein the left and right side portions are formed with indentations for retaining the user's flexed forearms in a given orientation relative the hand-grips.

14. The accessory of claim 7, wherein the left and right side portions carry resilient padding which provide cushioning as well as frictional gripping to the user's forearms when flexed thereagainst.

15. The accessory of claim 7, wherein the left and right side portions carry sleeves which are formed with indentations for retaining the user's flexed forearms in a given orientation relative the hand-grips.

* * * * *